(12) United States Patent
Lauer

(10) Patent No.: US 12,576,945 B2
(45) Date of Patent: Mar. 17, 2026

(54) PEDAL WITH ADJUSTABLE ROTATION BRAKE

(71) Applicant: Sport Import GmbH, Edewecht (DE)

(72) Inventor: Swen Lauer, Garmisch-Partenkirchen (DE)

(73) Assignee: SPORT IMPORT GMBH, Edewecht (DE)

( * ) Notice: Subject to any disclaimer, the term of this patent is extended or adjusted under 35 U.S.C. 154(b) by 0 days.

(21) Appl. No.: 18/906,469

(22) Filed: Oct. 4, 2024

(65) Prior Publication Data

US 2025/0026436 A1 Jan. 23, 2025

Related U.S. Application Data

(63) Continuation of application No. PCT/EP2023/058557, filed on Mar. 31, 2023.

(30) Foreign Application Priority Data

Apr. 6, 2022 (DE) .......................... 102022203450.3

(51) Int. Cl.
| | |
|---|---|
| *B62M 3/08* | (2006.01) |
| *F16D 49/10* | (2006.01) |
| *F16D 65/18* | (2006.01) |
| *F16D 121/14* | (2012.01) |
| *F16D 127/04* | (2012.01) |

(52) U.S. Cl.
CPC .............. *B62M 3/08* (2013.01); *F16D 49/10* (2013.01); *F16D 65/18* (2013.01); *F16D 2121/14* (2013.01); *F16D 2127/04* (2013.01)

(58) Field of Classification Search
CPC .... B62M 3/08–12; F16D 49/10; F16D 65/18; F16D 2121/14; F16D 2127/04
See application file for complete search history.

(56) References Cited

U.S. PATENT DOCUMENTS

| | | | | | |
|---|---|---|---|---|---|
| 4,103,563 A | * | 8/1978 | Genzling | ............... | B62M 3/083 |
| | | | | | 74/594.5 |
| 4,922,786 A | * | 5/1990 | Romano | ................ | B62M 3/086 |
| | | | | | 74/594.6 |

(Continued)

FOREIGN PATENT DOCUMENTS

| | | | | | |
|---|---|---|---|---|---|
| DE | 2025867 A1 | * | 5/1970 | .............. | B62M 3/08 |
| DE | 2657383 A1 | | 6/1977 | | |
| DE | 3908158 A1 | | 9/1989 | | |

(Continued)

OTHER PUBLICATIONS

International Search Report (English and German) and Written Opinion for international application No. PCT/EP2023/058557, dated Jun. 30, 2023, 10 pages.

*Primary Examiner* — Thomas C Diaz
(74) *Attorney, Agent, or Firm* — Tarolli, Sundheim, Covell & Tummino LLP

(57) ABSTRACT

The concept described herein relates to a pedal having a pedal body, a pedal axis which extends at least partly through the pedal body, wherein the pedal body is supported to be rotatable on the pedal axis, and an adjustable rotation brake which, during rotation of the pedal body, exerts an adjustable braking force on the pedal axis in order to brake the rotation of the pedal body when compared to an unbraked rotation.

9 Claims, 5 Drawing Sheets

100

120 180 111

110

112

(56)         References Cited

U.S. PATENT DOCUMENTS 4,969,373  A  *  11/1990  Good ..................... B62M 3/083
                                                          188/24.11
5,078,026  A  *   1/1992  Giffin .................... B62M 3/083
                                                          74/594.6

FOREIGN PATENT DOCUMENTS

DE          4016651  A1    11/1991
DE          4022736  A1     1/1992
DE     102021124558  A1     4/2022
EP          2374701  A1    10/2011
NL          7713672  A  *   6/1978   ............. B62M 3/08
WO          8904791  A1     6/1989

* cited by examiner

PEDAL WITH ADJUSTABLE ROTATION BRAKE

CROSS-REFERENCE TO RELATED APPLICATIONS

This application is a continuation of copending International Application No. PCT/EP2023/058557, filed Mar. 31, 2023, which is incorporated herein by reference in its entirety, and additionally claims priority from German Application No. 102022203450.3, filed Apr. 6, 2022, which is also incorporated herein by reference in its entirety.

TECHNICAL FIELD

The innovative concept described herein relates to a pedal, in particular for bicycles. According to the invention, the pedal comprises an adjustable rotation brake with which the force entailed for rotating the pedal can be adjusted. As a result, the pedal can be adjusted as desired such that it rotates either with difficulty or smoothly.

BACKGROUND OF THE INVENTION

Pedals are usually used in vehicles which are driven by means of a pedal crank, i.e. the driving force is transmitted to the driven wheel or the driven wheels by means of a chain drive, a belt drive or the like via the pedal crank. The pedals serve to enable the driver to transmit a force to the pedal crank and thereby enable him to stand safely.

This form of drive is used in particular in two-wheel vehicles. These include non-motorized bicycles and bicycles with motor support, such as for example so-called pedelecs or e-bikes. However, multi-track vehicles, such as, for example, three-wheel vehicles or four-wheel vehicles, are also partially equipped with a crank drive.

The pedals are screwed into the crank. For this purpose, the pedals have an axis which has a thread on the vehicle side by means of which the pedal is screwed into a corresponding mating thread in the crank. The pedal body is mounted to be rotatable on this axis so that the pedal is always located horizontally during rotation of the crank in order to offer the driver a horizontal stepping surface and thus to enable continuous pedaling.

However, on the other hand, this also means that the pedal can rotate freely at any time when it is attached to the crank. However, this may be undesirable in some fields of use. For example, in BMX or mountain bike sports, rotations of the pedal are undesirable in some situations, for example in the case of jumps. In the case of the so-called slope style, a discipline in which the athlete performs high jumps over jump platforms, it may well occur that the athlete lifts his shoe off the stepping surface of the pedal. This occurs in particular when tricks are additionally added during the so-called air time. When the contact between the shoe and the pedal is lost, the pedal can rotate freely. Thus, it is difficult for the driver to hit the rotating pedal exactly again when landing in order to avoid falling when landing the trick.

In order to prevent these unwanted rotations of the pedal, pedals are available on the market which have an O-ring and a plain bearing which exerts a high frictional force on the pedal axis, with the result that the pedal rotates with more difficulty. However, these plastic plain bearings are subject to high wear, in particular caused by pedaling during normal travel. In addition, a highly braking pedal is absolutely undesirable during pedaling, and in particular when driving uphill, since the high frictional forces mean an additional physical exertion of force for the driver.

It would therefore be desirable to improve existing pedals in that they largely prevent an undesired rotation of the pedal (for example in the case of jumps), but at the same time permit a desired rotation of the pedal (for example when driving uphill), and at the same time exhibit high durability.

SUMMARY

According to an embodiment, a pedal may have: a pedal body, a pedal axis which extends at least partly through the pedal body, wherein the pedal body is supported to be rotatable on the pedal axis, and an adjustable rotation brake which, during rotation of the pedal body, exerts an adjustable braking force on the pedal axis in order to brake the rotation of the pedal body when compared to an unbraked rotation.

The pedal according to the invention comprises a pedal body, and a pedal axis which extends at least partly through the pedal body. The pedal body is supported to be rotatable on the pedal axis. According to the invention, the pedal comprises an adjustable rotation brake which, during rotation of the pedal body, exerts an adjustable braking force on the pedal axis in order to brake the rotation of the pedal body when compared to unbraked rotation. This makes it possible to adjust the braking force acting on the pedal axis as desired. For example, a slope stylist, i.e. an athlete who performs jumps and tricks with his bicycle, can increase the braking force before departure, with the result that the pedals can be rotated hardly or only with difficulty. A cross country driver or marathon driver, on the other hand, can reduce the braking force before travelling uphill, with the result that the pedals can be rotated very easily and virtually without resistance in order to have as few friction losses as possible while pedaling.

According to a conceivable embodiment, the rotation brake can be integrated in the pedal body, i.e. installed within the pedal body. This protects the rotation brake from dust and dirt. Alternatively or additionally, the rotation brake can be actuatable in a manner accessible from outside by means of actuating means arranged in the pedal body in order to thereby adjust the braking force of the rotation brake. This allows simple actuation and accessibility of the rotation brake integrated in the pedal from outside, with the result that the rotation brake can be actuated without having to remove the same from the pedal for this purpose.

According to a further conceivable embodiment, the actuating means can be configured in the form of a threaded pin which is screwed into a thread provided in the pedal body. In this case, an axial end of the threaded pin projecting into the pedal body can be in contact with the rotation brake and thereby exert a force on the rotation brake. This is a simple type of configuration for actuating the rotation brake from outside, in particular when the same is integrated in the pedal. The screw can be a grub screw which is screwed into the pedal body from above. When the screw is screwed in, the screw penetrates ever deeper into the pedal body and in this case presses ever more strongly on the rotation brake, which thus exerts an ever stronger braking force on the pedal axis. When the screw is screwed out, exactly the opposite applies.

According to a further conceivable embodiment, the rotation brake can have a friction body which is in contact with a part of the pedal axis in order to exert the braking force in the form of a frictional force on the pedal axis. The friction body can advantageously include a material which achieves a high frictional force relative to the material of the pedal axis, i.e. the friction body pairing between the pedal axis and the friction body is to have the highest possible coefficient of friction u. Pedal axes are generally manufactured from aluminum or titanium. The rotation brake according to the invention can be manufactured from plastic. The rotation brake can, for example, include a material which is also used for producing plain bearing bushes.

According to a further conceivable embodiment, the rotation brake can be configured in the form of a shaft sleeve which is arranged around the pedal axis. Alternatively or additionally, the shaft sleeve can have a slot which is transverse with respect to the circumferential direction and which defines a gap with a variable gap width on the circumference of the shaft sleeve. The shaft sleeve can thus be configured to be slotted, i.e. the shaft sleeve can have a transverse slot and can thus be open or unraveled in the region of the slot. This slot thus unravels the shaft sleeve so that the latter is not configured to be closed over the entire circumference. The slot defines a gap and the width of the slot in turn accordingly defines the gap width. For example, the shaft sleeve can have an annular shape, wherein the ring has a slot at one point and is open or unraveled at this point so that the ring is not closed over the entire circumference. At this opening or at this slot, the annular shaft sleeve can be pulled apart so that the gap width becomes larger and the inner radius of the shaft sleeve accordingly increases. On the other hand, the shaft sleeve can be compressed at this opening or at this slot so that the gap width becomes smaller and the inner radius of the shaft sleeve accordingly decreases.

According to a further conceivable embodiment, the shaft sleeve can exert a clamping force on the pedal axis, wherein the amount of the clamping force is variable by a variation of the gap width. As mentioned above, the gap width can be varied by widening the shaft sleeve or by compressing the shaft sleeve. This is similar to the functional principle of a preloaded clamp or clamp. The slotted shaft sleeve thus clamps the pedal axis in between. The shaft sleeve exerts a clamping force on the pedal axis. If, as described above, the gap width is reduced (e.g. by compressing the shaft sleeve), the clamping force increases accordingly. As a result of an increase in the clamping force, the frictional force exerted on the pedal axis also increases, and the braking force increases accordingly, with the result that the pedal rotates more slowly or with more difficulty. If, on the other hand, as described above, the gap width increases (e.g. by pulling apart or loosening the shaft sleeve), the clamping force is reduced accordingly. As a result of a reduction in the clamping force, the frictional force exerted on the pedal axis also decreases, and the braking force is reduced accordingly, with the result that the pedal rotates faster or more easily.

This embodiment of the shaft sleeve has a further important advantage. The bearing play of the pedal axis can also be adjusted via the variation of the gap width. As a result of wear, the pedal axis can have an increasing radial bearing play, i.e. the axis begins to flap in the pedal body. This radial bearing play can be compensated by readjusting the rotation brake, i.e. by increasing the clamping force. The rotation brake thus also serves as an adjustable bearing. Accordingly, the rotation brake can be configured to adjust or compensate a radial bearing play by varying the clamping force.

According to a further conceivable embodiment, the rotation brake can have a projection which extends radially outward from the circumference of the shaft sleeve, wherein the projection and the actuating means are oriented with respect to each other such that a force can be exerted on the projection by means of the actuating means, in order to thereby vary the gap width in the shaft sleeve and thereby adjust the braking force acting on the pedal axis. The shaft sleeve can advantageously have such a projection in the region of the slot, i.e. where the slot unravels the shaft sleeve and forms two (opposite) open ends of the shaft sleeve, this projection can be provided on an open end of the shaft sleeve. This projection forms a type of tab by means of which the slot in the shaft sleeve can be compressed in order to reduce the gap width. Likewise, at this projection or at this tab, the slot in the shaft sleeve can be pulled apart in order to increase the gap width.

According to a further conceivable embodiment, the projection can have a recess into which the actuating means engages. A shape-fitting connection between the actuating means and the projection can be made by this so that the actuating means is connected to the projection in a shape-fitting and thus secure manner. Thus, the actuating means can be prevented from slipping off the projection.

According to a further conceivable embodiment, a recess can be provided in the pedal body into which the projection of the shaft sleeve can be inserted. The recess in the pedal body can have a contour which is complementary to the contour of the projection on the shaft sleeve. Thus, it can first be ensured that the shaft sleeve together with the projection can be fitted into the pedal body. In addition, a shape-fitting connection between the pedal body and the shaft sleeve can be made. Alternatively or additionally, the recess in the pedal body can have an oversize with respect to the projection, so that the projection is arranged to be movable in the recess. This means that the contour of the recess in the pedal body can be somewhat larger than the contour of the projection on the shaft sleeve. Thus, it can be ensured that the projection can move (e.g. up and down) within the pedal body so that the gap width can be varied.

According to a further conceivable embodiment, the rotation brake can be arranged in a region of the pedal body in which the pedal axis emerges from the pedal body. This allows easy accessibility of the rotation brake, for example for maintenance purposes. Where the pedal axis protrudes from the pedal body, the pedal axis is also removed. Thus, if the rotation brake is arranged on the pedal axis at the very beginning thereof, the rotation brake is also directly accessible when releasing the pedal axis. This means that the pedal axis merely has to be removed a small distance from the pedal body in order to reach the rotation brake directly.

According to a further conceivable embodiment, the braking force can be adjustable continuously. In addition, the braking force can be adjustable freely between 0% and 100%. This means that the rotation brake can be completely closed (braking force=100%), for example by the gap being virtually closed. The rotation brake then has its maximum braking force. However, the rotation brake can also be completely open, for example by the rotation brake bearing lying only loosely on the pedal axis, with the result that a noticeable braking force no longer acts on the pedal axis.

BRIEF DESCRIPTION OF THE DRAWINGS

Some exemplary embodiments are illustrated by way of example in the drawings and will be explained below, in which:

FIG. 2 shows a partially transparent illustration of the pedal in a perspective view according to an embodiment;

DETAILED DESCRIPTION OF THE INVENTION

Figure 1:
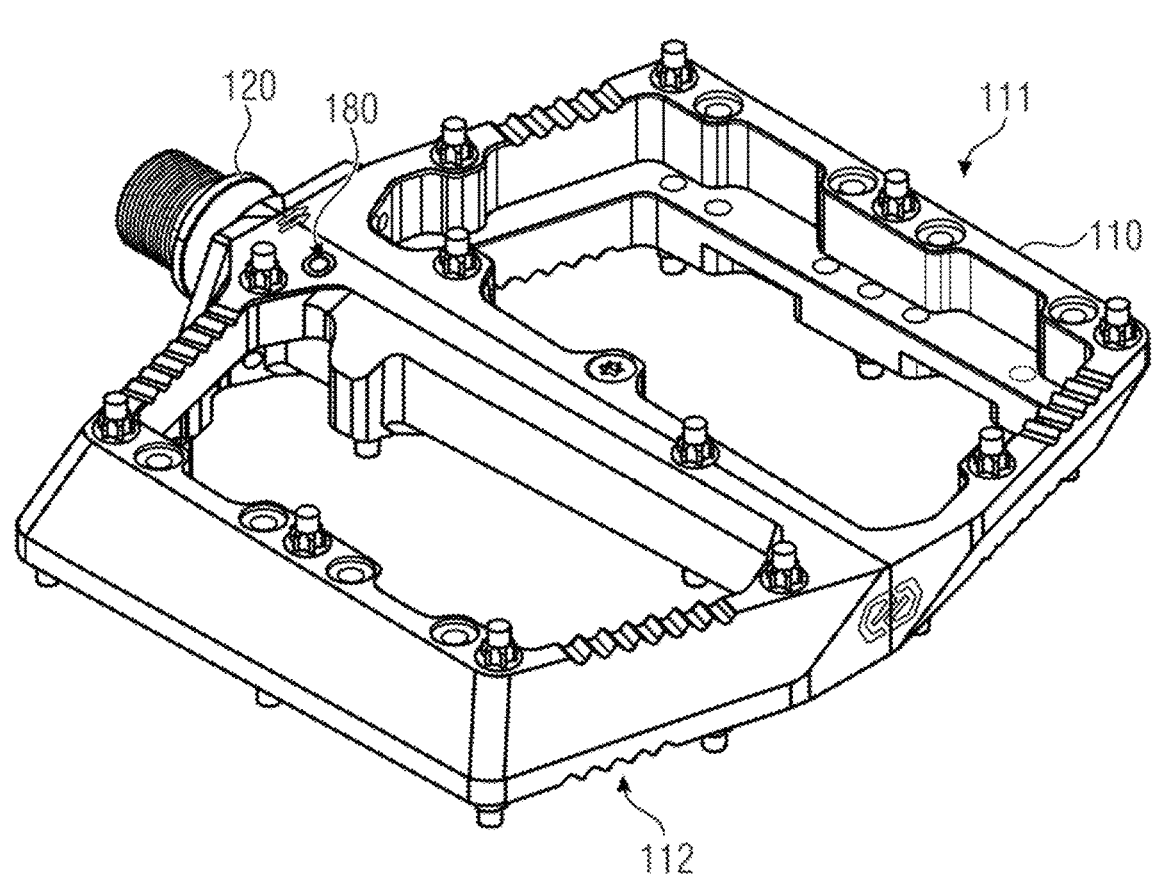
FIG. 1 shows a schematic perspective view of a pedal according to an embodiment.

In the following, embodiments will be described in more detail referring to the figures, wherein elements with the same or similar function are provided with the same reference numerals.

The inventive pedal is described using the example of a bicycle pedal, in particular using the example of a so-called platform pedal, which is also referred to as flat pedal. However, all explanations made herein of course also apply to other pedal forms, such as click pedals. In addition, the description contained in this document applies to pedals, irrespective of the vehicle on which they are mounted. For example, the present invention relates both to pedals which are mounted on non-motorized bicycles and to pedals which are mounted on motorized bicycles, such as e-bikes, pedelecs and the like.

FIG. 1 shows a perspective view of a pedal 100. This is a bicycle pedal, and in particular a so-called platform pedal, which is also referred to as flat pedal. The pedal 100 comprises a pedal body 110 with a first stepping surface 111 and an opposite second stepping surface 112. While pedaling, the driver stands with his shoe on one of these stepping surfaces 111, 112.

The pedal body 110 comprises actuating means 180 which can be provided or integrated in one of the stepping surfaces 111, 112. The actuating means 180 serves for actuating a rotation brake according to the invention, as will be described in more detail referring to the following figures. The rotation brake is integrated in the pedal body 110, which is why it is not visible in the view illustrated in FIG. 1.

The pedal 100 also comprises a pedal axis 120 which extends at least partially through the pedal body 110. This can be seen more clearly in the partially transparent view in FIG. 2. The pedal axis 120 can be introduced into the pedal body 110 through an insertion opening 130 provided in the pedal body 110. In the embodiment shown here, the pedal axis 120 extends approximately to the center of the pedal body 110 or by up to ⅔ into the pedal body 110. In other embodiments (not explicitly illustrated here), the pedal axis 120 can extend almost completely through the pedal body 110, i.e. nearly to the side 140 of the pedal body 110 opposite the insertion opening 130.

The pedal body 110 is supported to be rotatable on the pedal axis 120. This can be accomplished, for example, by means of suitable bearings, 150, 160. These are in particular radial bearings which limit the play of the pedal axis 120 in the radial direction.

For example, a first radial bearing 160, for example in the form of a plain bearing, can be provided in a rear axis section, i.e. in the region close to the insertion opening 130. This can be a sliding bush which is arranged around the pedal axis 120.

A second radial bearing 150 can be provided in a front axis section, i.e. in a section of the pedal axis 120 located at a distance from the insertion opening 130. This can be, for example, a ball bearing 151, advantageously a grooved ball bearing, which is arranged on the pedal axis 120. As is illustrated purely exemplarily in FIG. 2, a second ball bearing 152 can also be arranged on the pedal axis 120.

Instead of the first and/or second ball bearing 151, 152, a plain bearing, for example in the form of a sliding bush, can also be provided.

According to the invention, the pedal 100 also comprises an adjustable or settable rotation brake 170. The rotation brake 170 can be seen more clearly in the enlarged illustration according to FIG. 3.

The rotation brake 170 is configured to exert an adjustable braking force on the pedal axis 120 during rotation of the pedal body 110 in order to brake the rotation of the pedal body 110 when compared to an unbraked rotation. This means that the rotation brake 170 brakes the rotation of the pedal 100. The braking force which the rotation brake 170 exerts on the pedal axis 120 for this purpose is adjustable. This means that the rotation of the pedal 100 can be adjusted by means of the rotation brake 170 according to the invention. Thus, for example, a driver can adjust whether the pedal 100 rotates fast or easily, or else with difficulty or slowly.

For this purpose, the braking force of the rotation brake 170 can advantageously be adjusted continuously between 0% and 100%. This means that the rotation brake 170 can be adjusted such that it exerts virtually no noticeable braking force (braking force=0%) on the pedal axis 120. As a result, the pedal body 110, with the exception of the frictional forces of the abovementioned bearings 150, 160, can rotate freely on the pedal axis 120 almost without further braking forces caused by the rotation brake 170. However, the rotation brake 170 in contrast can also be adjusted such that it exerts a maximum braking force (braking force=100%) on the pedal axis 120. In this case, the pedal 100 can be braked so strongly by means of the rotation brake 170 that the pedal body 110 can hardly be rotated freely on the pedal axis 120. In this case, the braking force can advantageously be adjustable continuously.

Figure 2:
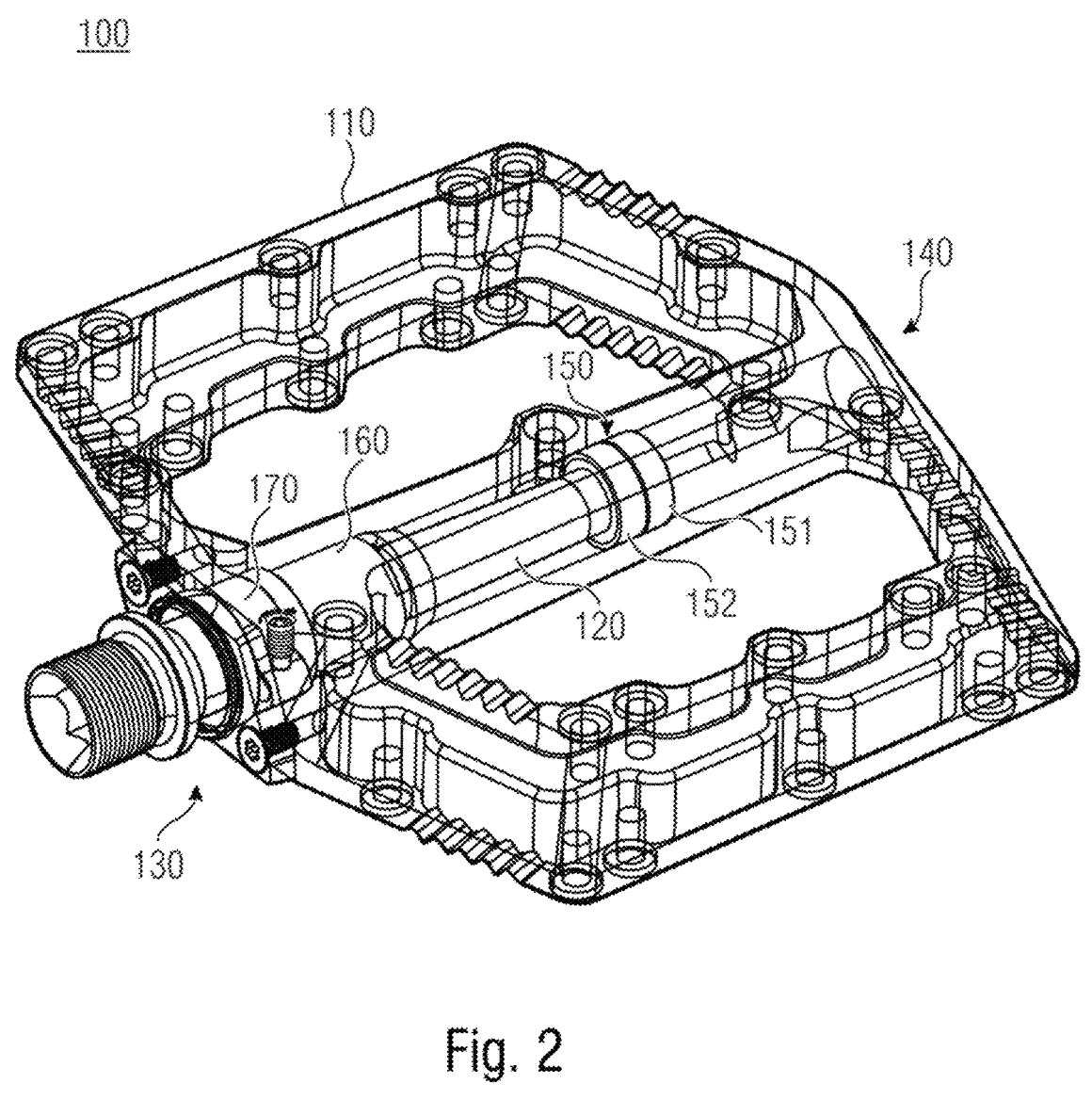
Figure 3:
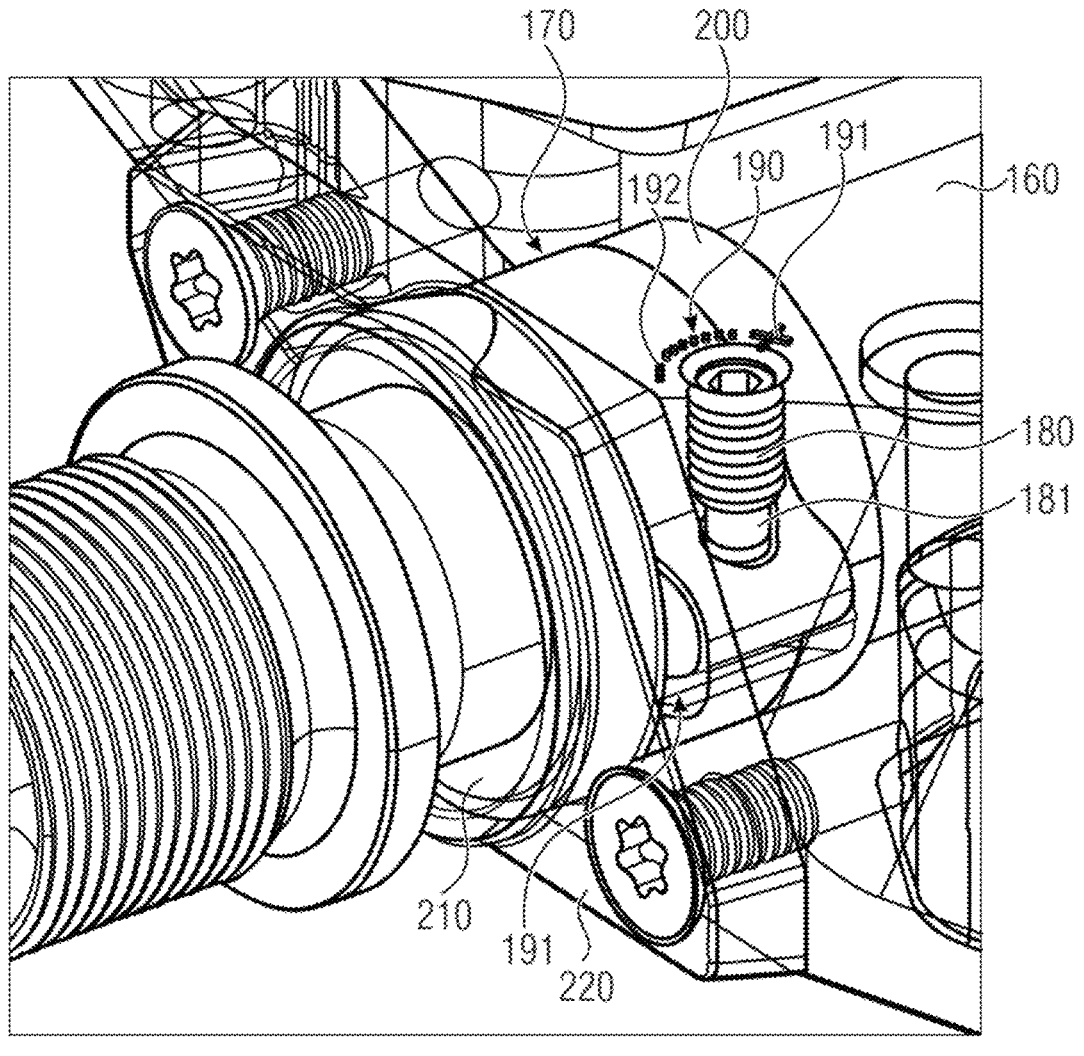
FIG. 3 shows an enlarged part of the pedal for visualizing the inventive rotation brake according to an embodiment.

As can be seen in FIGS. 2 and 3, the rotation brake 170 can be integrated in the pedal body 110. This means that the rotation brake 170 can be installed within the pedal body 110. The rotation brake 170 integrated in the pedal body 110 can be actuated from outside by means of actuating means 180 accessible from outside. In this case, the actuating means 180 can be arranged on or in the pedal body 110.

The actuating means 180 can be, for example, a threaded pin, as is illustrated exemplarily in FIG. 3. The actuating means 180 can be configured, for example, in the form of a grub screw which can be screwed into a corresponding bore in the pedal body 110. In this case, an axial end portion 181 of the actuating means 180 or of the threaded pin (e.g. grub screw) projecting into the pedal body can come into contact with the rotation brake 170 in order to thereby exert a force on the rotation brake 170. This actuating force exerted on the rotation brake 170, e.g. in the form of a compressive force, causes the braking force which the rotation brake 170 exerts on the pedal axis 120. In other words, the rotation brake 170 converts the actuating force acting on it (by means of the actuating means 180) into the desired braking force in order to brake the pedal axis 120.

In this case, the actuating force and the braking force correlate with each other, i.e. the greater the actuating force exerted on the rotation brake 170, the greater also the braking force which can be exerted on the pedal axis. Vice versa, of course, the lower the actuating force acting on the rotation brake 170, the lower the braking force acting on the pedal axis 120.

The rotation brake 170 can transmit the braking force on the pedal axis 120, for example, by means of a friction body, wherein the braking force is exerted on the pedal axis 120 in the form of a frictional force. For this purpose, the friction body can be in contact with a part of the pedal axis 120, for example. In this case, the friction body and the pedal axis 120 form a friction body pairing. The friction body pairing is to advantageously have a high coefficient of friction u in order to exert the highest possible frictional force, and thus the highest possible braking force, on the pedal axis 120 by means of moderate actuating forces. According to conceivable embodiments, the friction body can include a material which is also used for plain bearings or sliding bushes. For example, the friction body and the sliding bush 160 can be produced from the same material.

Figure 4:
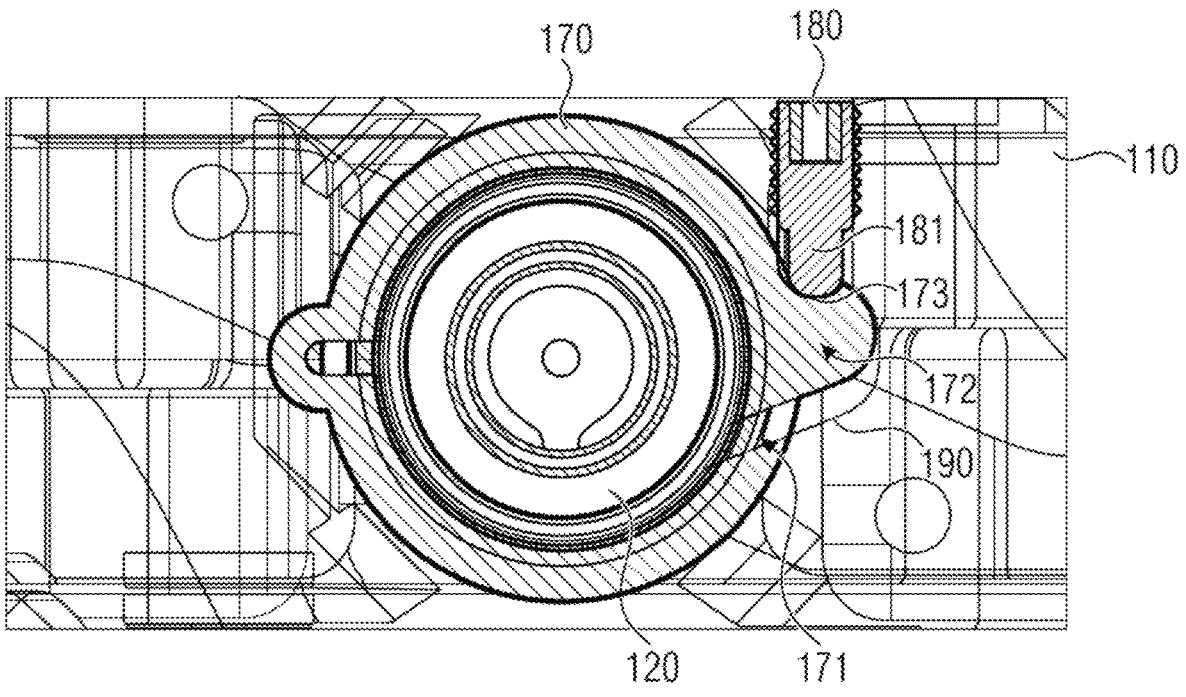
FIG. 4 shows a schematic sectional illustration of the inventive rotation brake in a front view.

As can be seen most clearly in FIGS. 3 and 4, the rotation brake 170 can be configured, for example, in the form of a shaft sleeve which is arranged around the pedal axis 120. In this example, the shaft sleeve 170 forms the friction body mentioned above which is in contact with the pedal axis 120.

The shaft sleeve 170 can have a slot 171 which is transverse with respect to its circumferential direction, i.e. the shaft sleeve 170 is not closed over the entire circumference. The slot 171 defines a gap with a variable gap width on the circumference of the shaft sleeve 170. Due to the slot 171, the shaft sleeve 170 becomes deformable elastically. For example, the radius or the circumference of the shaft sleeve 170 can be reduced by the amount of the gap width of the slot 171 by compressing the shaft sleeve 170. If the deformation of the shaft sleeve 170 is elastic or remains elastic, the shaft sleeve 170 can also return to its original shape with its original radius.

As can be seen in particular in FIG. 4, the shaft sleeve 170 can exert a clamping force on the pedal axis 120. The amount of the clamping force can be variable by a previously described variation of the gap width. For example, compressing the shaft sleeve 170 causes the radius of the shaft sleeve 170 to decrease, thereby reducing the gap width of the slot 171. The clamping force which can be exerted on the pedal axis 170 can be increased accordingly. If the compressed shaft sleeve 170 is loosened again, the radius of the shaft sleeve 170 accordingly increases again, the gap width of the slot 171 also increases again by this. The clamping force which can be exerted on the pedal axis 120 is reduced accordingly.

In order to generate the clamping force, the abovementioned actuating means 180 exerts an actuating force on the rotation brake 170. In this case, the rotation brake 170 can advantageously have a projection 172 which extends radially outward from the circumference of the rotation brake 170. This projection 172 can be configured in the form of a tab which projects radially from the rotation brake 170.

Thus, the actuating means 180 can exert the actuating force on this projection 172. This means that the projection 172 and the actuating means 180 can be oriented with respect to each other such that the actuating force can be exerted on the projection 172 by means of the actuating means 180 in order to thereby vary the gap width in the shaft sleeve 170 and thereby adjust the braking force acting on the pedal axis 120.

For example, the actuating means 180 can be guided inwards, i.e. into the pedal body 110, in order to exert an actuating force on the rotation brake 170. If the actuating means 180 is, for example, a threaded pin (e.g. a grub screw), the actuating force on the projection 172 can be increased by screwing in the threaded pin 180. The clamping force with which the rotation brake 170 clamps the pedal axis 120 is increased by this. The coefficient of friction u of the friction body pairing between the rotation brake 170 and the pedal axis 120 clamped therein determines the braking force which can be exerted on the pedal axis 120 by this.

This means that the further the actuating means 180 is screwed into the pedal body 110, the stronger it presses on the projection 172. The slotted shaft sleeve 170 is increasingly pressed together by this, with the result that the gap width is reduced, the clamping force on the pedal axis 120 being increased by this. The braking force acting on the pedal axis 120 is also increased by this.

If, on the other hand, the actuating means 180 is screwed out of the pedal body 110 in the opposite direction, it presses less strongly on the projection 172. The slotted shaft sleeve 170 is pushed back again into its original shape by this, with the result that the gap width increases again, the clamping force on the pedal axis 120 decreasing by this. The braking force acting on the pedal axis 120 is also reduced by this.

As can be seen in FIG. 3, an indicator can be provided in the pedal body 110 which indicates an increase or reduction in the braking force. This can be, for example, an indicator which is stamped or punched into the pedal body 110. For example, a "+" and a "−" can be stamped or punched in around the actuating means 180 in order to indicate to the user in which direction a rotation has to be performed in order to increase or reduce the braking force.

As can be seen again in FIG. 4, the previously described projection 172 can have a recess 173 into which the actuating means 180 can engage. For this purpose, the recess 173 is advantageously configured to be in a section of the projection 172 which is arranged opposite the actuating means 180. The recess 173 configured in the projection 172 and the actuating means 180 can each have a geometrical shape contour complementary to each other so that the actuating means 180 can engage in the recess 173 in a shape-fitting manner. Thus, it can be ensured that the actuating means 180 engages securely with the projection 172. The actuating means 180 slipping off the projection 172 can thus be prevented. Furthermore, it can be ensured that the rotation brake 170 is secured against axial slipping along the pedal axis 120.

A recess can be provided in the pedal body 110, into which the projection 172 of the rotation brake 170 can be inserted. This recess in the pedal body 110 is illustrated in FIG. 4 by means of the contour line provided with the reference numeral 190. The recess 190 has an oversize when compared to the projection 172, i.e. the recess 190 is larger than the projection 172 arranged therein. This results in a cavity in the recess 190, in which the projection 172 can move. Specifically, the projection 172 can then carry out a movement which is used in order to reduce or increase the gap width. This cavity 191 can be seen in FIG. 3.

Figure 5:
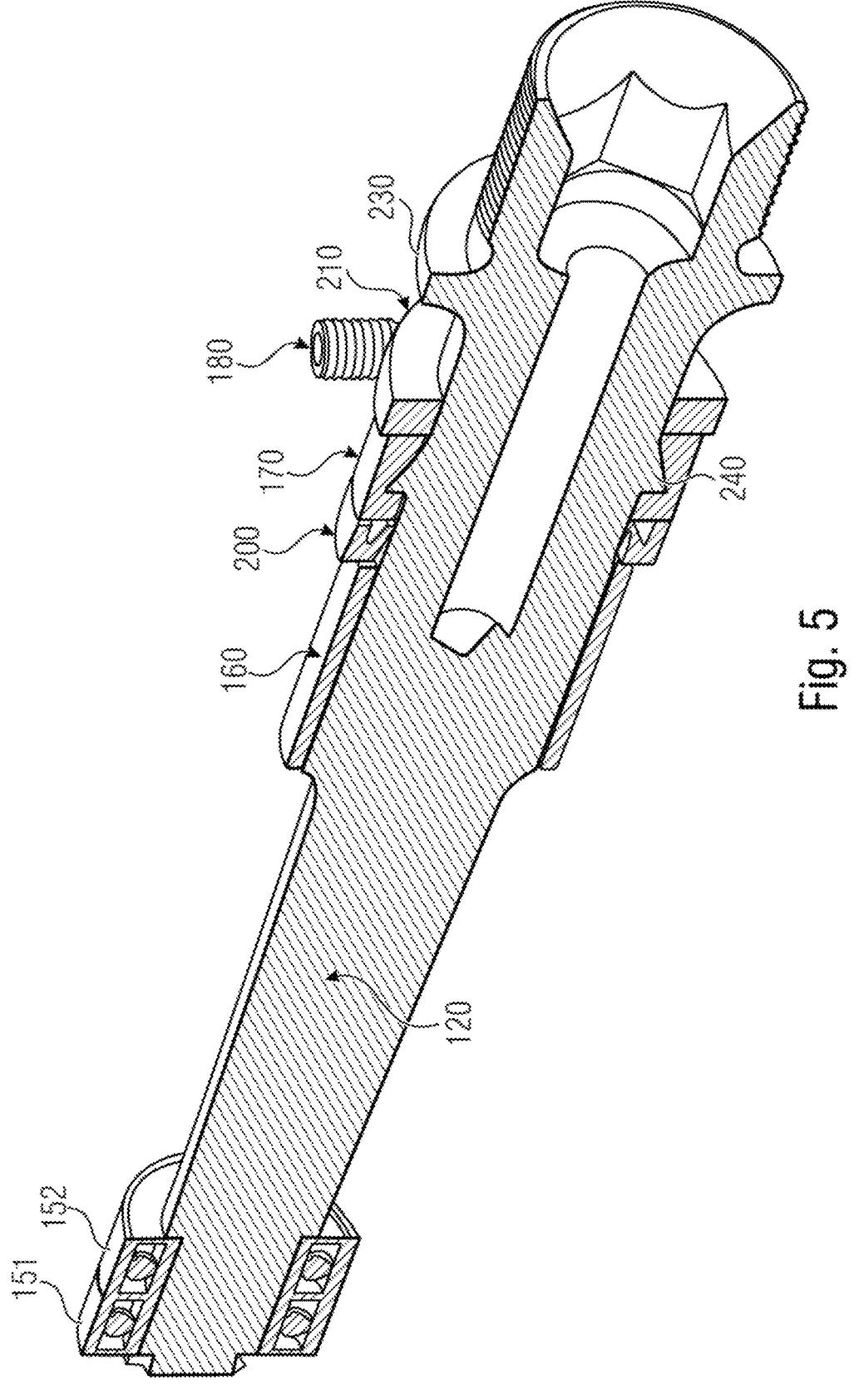
FIG. 5 shows a schematic longitudinal section through the pedal axis.

FIGS. 3 and 5 also show further optional components of the pedal 100 according to the invention. For example, a shaft disk 200 can be arranged between the plain bearing 160 and the rotation brake 170. The shaft disk 200 can include felt, for example. The shaft disk 200 can have a sealing effect in order, for example, to keep abrasion of the plain bearing 160 away from the rotation brake 170 and/or to prevent penetration of dirt, dust and moisture. The shaft disk 200 can thus also be referred to as dust seal.

A further shaft disk 210 can be provided in the region of the insertion opening 130 of the pedal axis 120 into the pedal body 110 in order to prevent dirt, dust and moisture from reaching the rotation brake 170. This further shaft disk 210 can include felt, for example. The rotation brake 170 can be arranged between the two shaft disks 200, 210. Thus, the rotation brake 170 can be secured not only against dust, dirt and moisture, but the rotation brake 170 can also be secured against axial slipping along the pedal axis 120.

The rotation brake 170 can advantageously be arranged in a region of the pedal body 110 in which the pedal axis 120 emerges from the pedal body 110. This means that the rotation brake 170 can be arranged in the region of the insertion opening 130 or at an end of the pedal body 110 which faces the vehicle, for example the pedal crank of a bicycle, in the installed state. If the pedal axis 120 is removed from the pedal body 110, it only has to be pulled out by a small distance so that the rotation brake 170 is directly accessible. The pedal axis 120 thus does not have to be removed completely to reach the rotation brake 170, for example for cleaning or maintenance purposes.

As can be seen in FIGS. 3 and 5, the pedal axis 120 can have a circumferential collar 230. A cover 220 (FIG. 3) can be arranged on the pedal axis 120, by means of which the insertion opening 130 can be closed. The cover 220 offers additional protection against penetrating dirt, dust and moisture. The cover 220 can be screwed onto the pedal body 110, for example. Thus, the cover 220 can be supported axially on the circumferential collar 230 of the pedal axis 120. This means that the cover 220 is supported on the circumferential collar 230 and thus secures the pedal axis 120 against axial slipping along the pedal axis 120. For example, the cover 220 can thus prevent the pedal axis 120 from slipping out from the pedal body 110.

Alternatively or additionally, the pedal axis 120 can have a circumferential collar 240 configured in the region of the rotation brake 170. This circumferential collar 140 can have a geometrical contour which engages with a complementary geometrical contour in the rotation brake 170. More precisely, the rotation brake 170 can have, on its circumferential inner side, i.e. on the side facing the pedal axis 120, such a complementary geometrical contour which engages the circumferential collar 240 of the pedal axis 120. In FIG. 5, a wedge-shaped contour is illustrated purely exemplarily, i.e. the circumferential collar 240 has a wedge shape, and the rotation brake 170 has a wedge-shaped recess complementary thereto. However, it is also conceivable for the two complementary geometrical structures to have a rectangular, triangular, round or other geometrical contour. These two complementary structures (collar 240 on the pedal axis 120 and recess in the rotation brake 170) can prevent axial slipping of the rotation brake 170 along the pedal axis 120.

Alternatively or additionally to the features described above, it is also conceivable for the pedal body 110 to have at least one inclined stepping surface 111, 112. In this regard, reference is again made to FIG. 1. Some embodiments provide for the pedal body 110 to have one (or two) outwardly sloping stepping surface(s) 111, 112. This means that the stepping surfaces 111, 112 could have a wedge shape, wherein the stepping surfaces 111, 112 can slope downwards obliquely (i.e. to the respective opposite stepping surface) from the exit side of the pedal axis 120 to the opposite end of the pedal body 110. In a state of the pedal 100 mounted on the bicycle, the stepping surfaces 111, 112 would thus slope outwards in a wedge-shaped manner. In this case, the wedge-shaped pedal 100 could have an outwardly sloping angle of 0.5° to 5°.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A pedal comprising:
a pedal body,
a pedal axle which extends at least partly through the pedal body,
wherein the pedal body is supported to be rotatable on the pedal axle, and
an adjustable rotation brake which, during rotation of the pedal body, exerts an adjustable braking force on the pedal axle in order to brake the rotation of the pedal body when compared to an unbraked rotation,
wherein the rotation brake is integrated in the pedal body,
wherein the rotation brake is actuatable in a manner accessible from outside by means of an actuator arranged in the pedal body in order to thereby adjust the braking force of the rotation brake, and
wherein the actuator is configured in the form of a threaded pin which is screwed into a thread provided in the pedal body, and wherein an axial end of the threaded pin projecting into the pedal body is in contact with the rotation brake and exerts a force on the rotation brake.

2. The pedal according to claim 1, wherein the rotation brake comprises a friction body which is in contact with a part of the pedal axle in order to exert the braking force on the pedal axle in the form of a frictional force.

3. The pedal according to claim 1, wherein the rotation brake is arranged on a side of the pedal body on which the pedal axle emerges from the pedal body.

4. The pedal according to claim 1, wherein the braking force is adjustable freely between 0% and 100%.

5. The pedal according to claim 1, wherein the braking force is adjustable continuously.

6. A pedal comprising:
a pedal body,
a pedal axle which extends at least partly through the pedal body,
wherein the pedal body is supported to be rotatable on the pedal axle, and
an adjustable rotation brake which, during rotation of the pedal body, exerts an adjustable braking force on the pedal axle in order to brake the rotation of the pedal body when compared to an unbraked rotation,
wherein the rotation brake is configured in the form of a shaft sleeve which is arranged around the pedal axle,
wherein the shaft sleeve comprises a slot which is transverse with respect to the circumferential direction and which defines a gap with a variable gap width on the circumference of the shaft sleeve, and
wherein the shaft sleeve exerts a clamping force on the pedal axle, and wherein the amount of the clamping force is variable by a variation of the gap width, and
wherein the shaft sleeve exerts a clamping force on the pedal axle, and wherein the amount of the clamping force is variable by a variation of the gap width.

7. The pedal according to claim 6, wherein the rotation brake comprises a projection which extends radially outwards from the circumference of the rotation brake, wherein the rotation brake is actuatable in a manner accessible from outside by means of an actuator arranged in the pedal body in order to thereby adjust the braking force of the rotation brake, and wherein the projection and the actuator are oriented with respect to each other such that a force can be exerted on the projection by means of the actuator in order to thereby vary the gap width in the rotation brake and thereby adjust the braking force acting on the pedal axle.

8. The pedal according to claim 7, wherein the projection comprises a recess into which the actuator engages.

9. The pedal according to claim 7, wherein a recess is provided in the pedal body, into which the projection of the rotation brake can be inserted, and wherein the recess comprises an oversize when compared to the projection so that the projection is arranged to be movable in the recess.

\* \* \* \* \*